United States Patent Office 3,702,224
Patented Nov. 7, 1972

3,702,224
MANDREL FOR EXTRUDED THERMOPLASTIC FILM
Howard C. North, Baytown, and Charles W. Williamson, Seabrook, Tex., assignors to Esso Research and Engineering Company
Continuation-in-part of application Ser. No. 887,270, Dec. 22, 1969. This application Mar. 26, 1971, Ser. No. 128,338
Int. Cl. B29d 23/04
U.S. Cl. 425—71                                    10 Claims

ABSTRACT OF THE DISCLOSURE

In the extrusion of a thermoplastic resin through a ring-die in a generally downward direction to form a tubular film, wherein the film is partially cooled by means of a cooling gas before being drawn over a cooling and sizing mandrel, the improvement characterized by using a mandrel having a flattened top, an uncooled upper section, a cooled lower section, a tapered profile in longitudinal cross-section and an external surface texture within the limits of 50 to 1,000 microinches RMS.

CROSS-REFERENCE TO RELATED APPLICATIONS

This application is a continuation-in-part of Ser. No. 887,270 filed Dec. 22, 1969.

PRIOR ART

Mandrels of the type described in U.S. Pats. 3,400,184 and 3,450,806 are illustrative of the mandrels which have been known and used in the prior art for cooling and sizing tubular film extruded from a ring-die. These mandrels feature essentially a unitary construction consisting of a cylindrical shell cooled by internal circulation of a cooling medium, a circumferential slot located above the cylindrical shell for the passage of cooling air and a truncated conical or hemispherical portion, above the air slot, attached to and in communication with the cylindrical shell permitting the conical or hemispherical portion to be cooled by the same cooling medium used for cooling the shell.

Attempts to use the prior-art mandrels with simple external air-rings of the type designated as 29 in FIGS. 11 and 14 in U.S. Pat. 3,400,184 produced film of inferior quality.

DEVELOPMENT AND SUMMARY OF INVENTION

Analysis of the defects in the film made with prior-art mandrels indicated that they were formed by volatile components in the extruded resin, formed by or released during extrusion, condensing on the cooled conical or hemispherical portion of the mandrel which then dripped down to the cylindrical shell causing opaque blemishes and streaks with the resulting film being unsuitable for use as a commercially acceptable packaging material. Permitting the mandrel to operate at a temperature of 90° C. by limiting the circulation of the cooling medium had surprisingly little favorable effect.

The mandrel of the instant invention was developed to overcome these difficulties and differs from prior art mandrels in the following essential features:

(1) The conical or hemispherical top portions of the prior art mandrels have been eliminated and replaced with a flattened top.

(2) The cylindrical shell has been tapered within the limits of 0.1 to 5.0% of diameter for each foot of mandrel length with its maximum diameter at the top so as to accommodate the shrinkage in circumference as the film is cooled and drawn down.

(3) The tapered shell has been divided into an uncooled upper section and a lower section in which a cooling medium is circulated countercurrently to the direction in which the film is transported.

(4) The exterior surface of the tapered shell has been treated to impart to it a surface texture within the limits of 50 to 1,000 microinches RMS.

Elimination of the conical top portion of the prior art mandrels and removal of cooling from the top portion of the mandrel of this invention has permitted the mandrel to be moved closer to the die so that the top of mandrel may be heated by radiation from the die. By means of these changes condensation of volatiles from the extruded resin is virtually eliminated. The tapered construction of the shell and the unique surface texture imparted to it prevent sticking or grabbing of the film while at the same time assuring good contact for high heat transfer. The improvements in the mandrel enumerated above permit production of an unblemished clear film at high speeds.

DESCRIPTION OF DRAWING

Referring to FIG. 1 molten thermoplastic resin 4 from an extruder (not shown) is filtered through a screen (not shown) to remove impurities and is extruded through die-gap 8 defined by internal die-cap 10 and external die adjusting ring 12 in annular ring-die 6. The tubular film leaving die-gap 8 is expanded by a stream of air from exit slot 38 to form an upper film bubble 20 which is partially cooled, and constrained and directed toward the top edge of the mandrel by air applied externally to the upper film bubble from air-ring 14.

Figure 2:
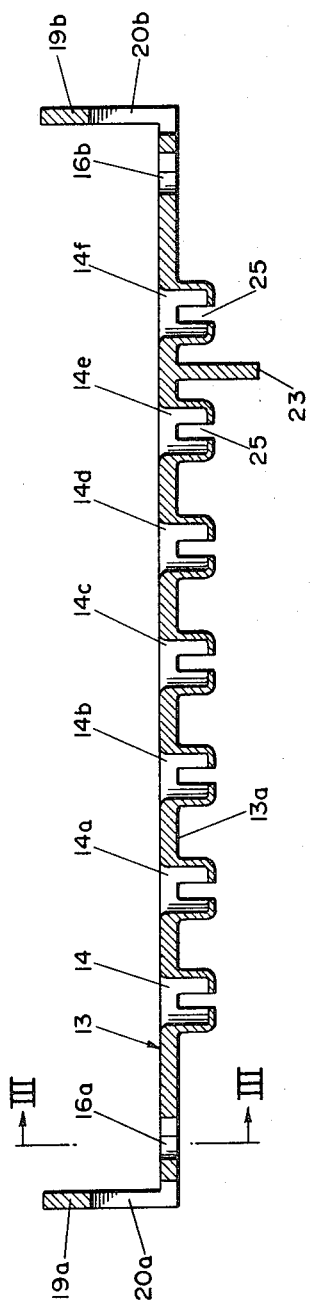

The film is drawn down over the external surface of mandrel shell 50 through water-bath 16 which cools the film below its solidification temperature and maintains the film in contact with the external surface of the mandrel shell by means of the hydrostatic head of the water. The finished film 18 leaving the bottom edge of the mandrel is maintained as a lower film bubble by air injected through line 32 until the film tube is flattened by nip-rolls and wound on take-up rolls.

In contrast to the unitary construction of prior art mandrels, the mandrels of the instant invention is distinguished by a sub-assembly construction which permits ready dismounting for maintenance, replacement or process changes. The mandrel assembly comprises a tapered shell 50 the upper end of which defines the lower lip of exit slot 38 for air. The top or cover plate 22 is a flattened disc or annulus the periphery of which defines the upper lip of exit slot 38.

The width and angle of exit slot 38 may be set as shown in FIG. 1, after use has demonstrated the optimum parameters or an alternate construction shown in FIG. 2

United States Patent Office 3,702,225
Patented Nov. 7, 1972

3,702,225
APPARATUS FOR MOULDING LINERS OF PLASTIC MATERIAL WITHIN CONTAINER CLOSURES
Gordon Asquith Deakin, Alan Eastwood, and Gordon Vinnicombe, all % W. R. Grace Ltd., Elneden Road, Park Royal, London NW. 10, England
Original application Oct. 28, 1968, Ser. No. 771,203, now Patent No. 3,587,819. Divided and this application May 7, 1970, Ser. No. 35,526
Claims priority, application Great Britain, Oct. 30, 1967, 49,134/67
Int. Cl. B29c *3/04, 17/14*
U.S. Cl. 425—112                                        10 Claims

ABSTRACT OF THE DISCLOSURE

The specification discloses a mechanism for transferring articles from one conveyor to another at a point where the two conveyors are moving along non-parallel paths. Studs on each conveyor engage in respective apertures in the article to support and locate the article. Preferably the conveyors are arranged to carry container closures through a closure moulding device which may also include a combined tool for severing a pellet from a rod of thermoplastic material and placing the pellet in a closure ready for cold moulding.

---

This application is a division of application, Ser. No. 771,203, filed Oct. 28, 1968, now U.S. Pat. No. 3,587,819.

The present invention relates to a transfer mechanism which may be used for transferring articles between two different conveyor systems. In particular the present invention provides a means for transferring articles from a horizontally moving conveyor onto a vertically moving conveyor and is suitable for use in a closure liner moulding apparatus.

According to the present invention we provide transfer apparatus comprising at least one article to be carried, and two conveyors moving along non-parallel paths, one of said conveyors being provided with at least one stud for engaging in an aperture in the or each article being carried, the other conveyor being provided with at least one further stud adapted to engage in a further aperture in the article, the two conveyors passing close to one another so that an article being carried may be transferred from one conveyor to another, the apertures in the article being so arranged that engaging movement of the stud of one conveyor with respect to the associated aperture of the article is in a direction tending to release the stud of the other conveyor from its associated aperture. Preferably each conveyor may be provided with two studs for engaging each article to be carried. Desirably the two conveyors may be moving along mutually perpendicular paths at the point of transfer of said article.

Suitably the articles may be trays adapted to be carried by the conveyors, each tray being provided with means for receiving smaller articles to be transported, the trays being transferred from one conveyor to the other by engagement of studs on the conveyors with apertures in the trays.

In order more positively to lock the tray with respect to at least one of the conveyors, the pegs or apertures associated with one conveyor may be provided with locking means. Advantageously the apertures associated with the pegs of one conveyor may be in the form of keyhole slots and the studs of that conveyor have shanks with larger diameter heads which heads are capable of passing through a large diameter portion of the keyhole slot but not passing through the narrow slit portion thereof. In order to lock the article with respect to said one conveyor a cam and cam follower arrangement may be provided for urging the article laterally in order to cause the shank of the stud to engage in the narrow slit portion of the keyhole slot. Suitably the cam and cam follower arrangement may comprise a peg formed on the article engaging with a cam track disposed adjacent the conveyor.

Conveniently the conveyors may be arranged so that the articles are transferred from a first conveyor to a second conveyor which carries them about a closed path and then replaces them on the first conveyor. In this embodiment it is preferable for one cam track to be provided in advance of the transfer station in order to unlock the article with respect to the first conveyor just before arrival at the transfer station and for a further cam track to be provided just downstream of the replacing station in order to relock the articles on the first conveyor.

Suitably the trays may be provided with upstanding lugs having cut away portions formed therein, the base of each tray at each end thereof being cut away to permit throughpassage of the studs of one of the conveyors so that such studs are able to engage in, and abut the walls of, the cutaway portion of each lug. Preferably the studs engaging in the cutaway portions of the lugs may be provided with transversely extending crook portions in order to locate the trays against lateral displacement.

Preferably one of the conveyors is driven for stepwise indexing movement and the other conveyor is driven for continuous movement.

According to another aspect of this invention we provide apparatus for moulding liners of plastics material within container closures, such apparatus including a transfer apparatus according to the first aspect of the invention; and wherein the articles to be carried are trays holding container closures in which liners are to be moulded, such liner moulding apparatus further including means for introducing closures to the trays, means for forming a pellet of mouldable thermoplastics material, means for placing said pellet inside a closure, means for pressing the pellet of material to form a closure liner, an oven through which one of said conveyors carries the trays in a substantially vertical direction of travel, the trays being returned to the other conveyor after travel through said oven, and means for collecting the lined closures after the trays have been returned to the first conveyor and the closures have been removed from the trays. Advantageously the means for forming a pellet of mouldable plastics material may comprise means for feeding a rod of said material to a rod holding device, a laterally reciprocable blade for severing a pellet from the end of said rod while the rod is stationary, means for moving said rod holding device laterally to carry the severed pellet into a laterally displaced position, and wherein the means for placing the severed pellet in a closure comprises a pellet dispensing plunger reciprocable to urge said pellet from its displaced position downwardly into a closure. Suitably the pellet holding device may comprise a plate having a thickness substantially the same as or greater than the thickness of the pellet to be formed, said plate being provided with a cylindrical aperture therein and sliding over an abutment surface on which is placed the lower end of a rod to be severed, said blade being arranged to reciprocate across the upper surface of the plate to sever the pellet from the remainder of the rod, means being provided for reciprocating said blade before the reciprocation of said pellet holding device to carry the pellet to its laterally displaced position. Conveniently the cylindrical aperture may communicate with a slot extending radially of the aperture and terminating at an edge of said plate, said slot being at least as wide as the pellet dispensing plunger, whereby the pellet holding device may, after removal of the pellet therefrom, be withdrawn away from its laterally displaced position before the pellet dispensing plunger has returned to its raised condition. Desirably the pellet dispensing plunger may be associated with a closure holding plunger which descends into the closure to locate the closure with respect to the pellet dispensing plunger, the pellet dispensing plunger being arranged to dispense the pellet downwardly through a passage extending axially of the closure holding plunger. Means may also be provided for reciprocating said pellet dispensing plunger through a predetermined stroke, means for restraining said closure holding plunger during a first part of said stroke, means for moving said closure holding plunger downwardly along with the pellet dispensing plunger during a final part of said stroke, and means for restraining said pellet dispensing plunger in a pellet holding position while said closure holding plunger commences the first part of its return stroke whereby the pellet is displaced downwardly out of the closure holding plunger.

The closure lining apparatus may be one in which the means for severing a pellet from said rod includes a pair of rod advancing rollers, at least one of which is driven to execute stepwise rotation in a rod feeding direction, the roller drive means including a crank associated with the or a driven roller by means of a ratchet arrangement, said crank being caused to execute pivotal motion in a first direction during a pellet dispensing operation, and said ratchet being arranged so that as said crank executes its return stroke, the driven roller remains stationary. Desirably the plastics rod may be fed downwardly towards the rod advancing rollers from a loop of rod material, the rod being fed by a further pair of rod feed rollers. Advantageously the loop of material may be caused to pass between a pair of spaced limit switches, the switches being associated with means for driving the rod feed rollers so that when the length of the loop shortens to the point where the loop causes one of the limit switches to operate, the drive means is energised to feed rod into the loop until the length of the loop increases to the point where the other limit switch is caused to operate and the drive means is deenergised. Conveniently the drive means is a clutch and the limit switches are electrically connected to effect engagement and disengagement of the clutch.

Figure 4:
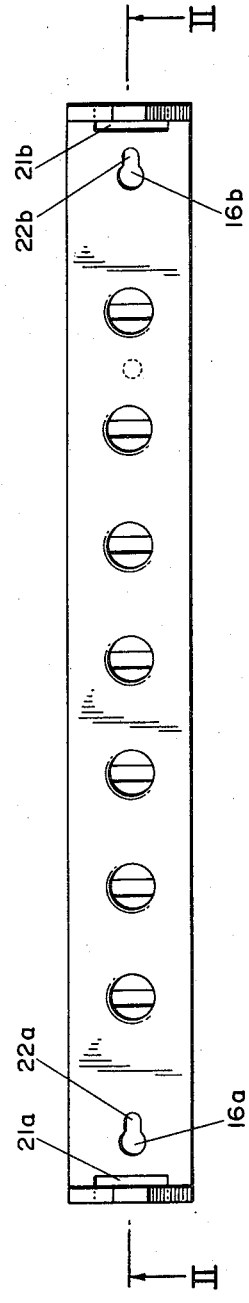
Figure 3:
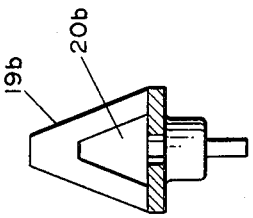
Figure 5:
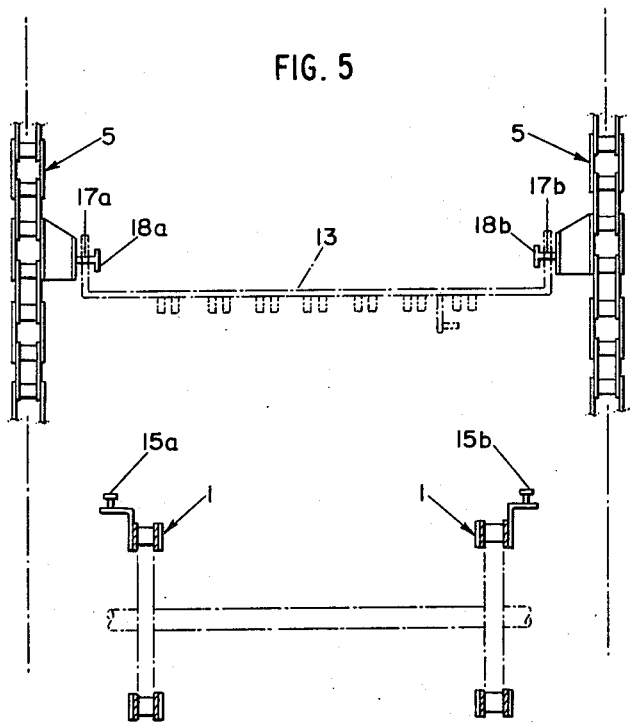
Figure 6:
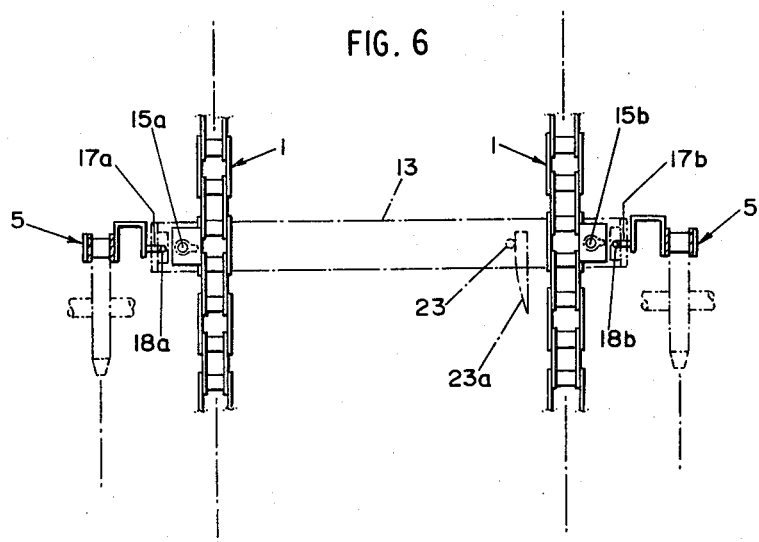
Figure 7:
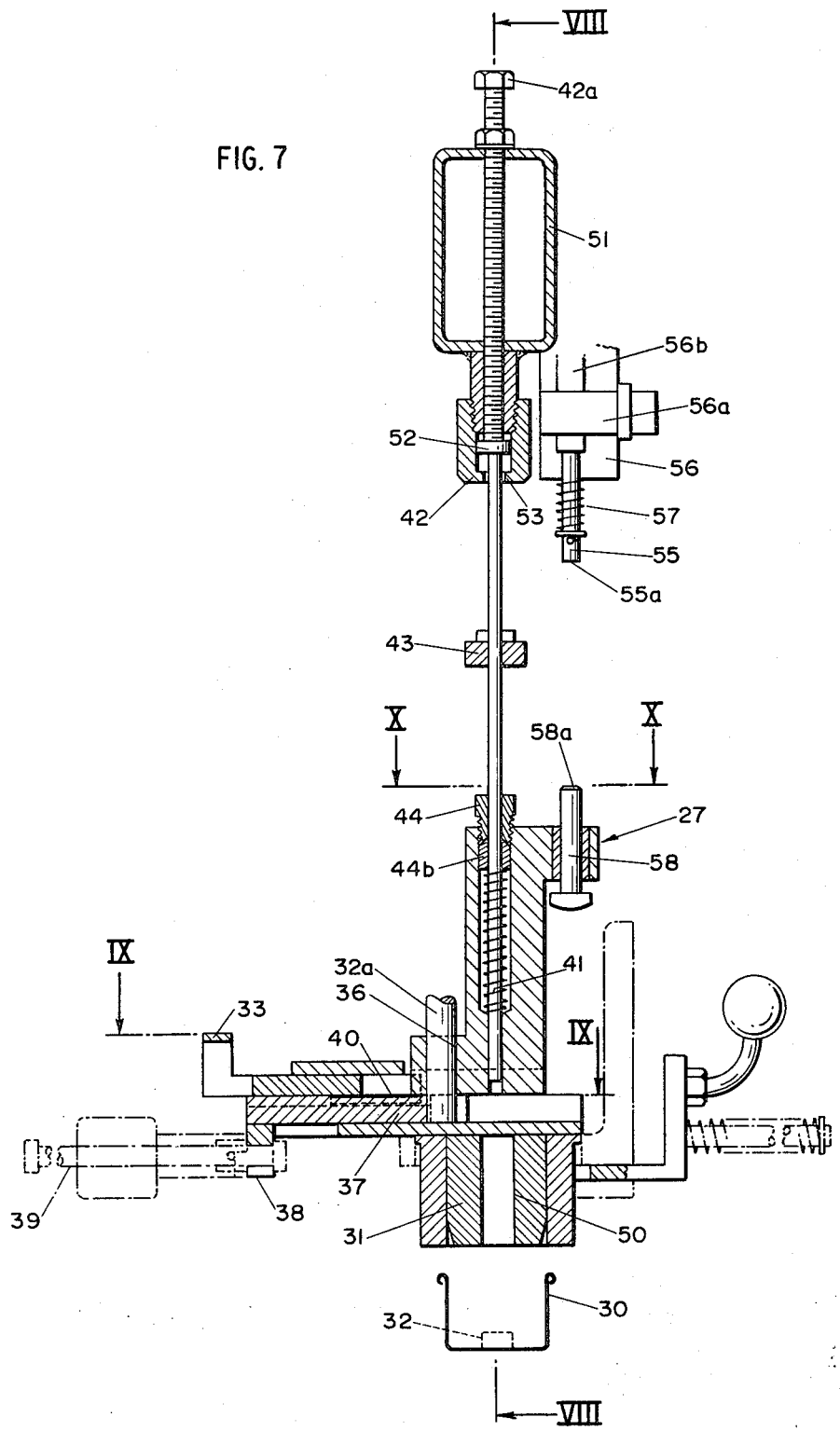
Figure 8:
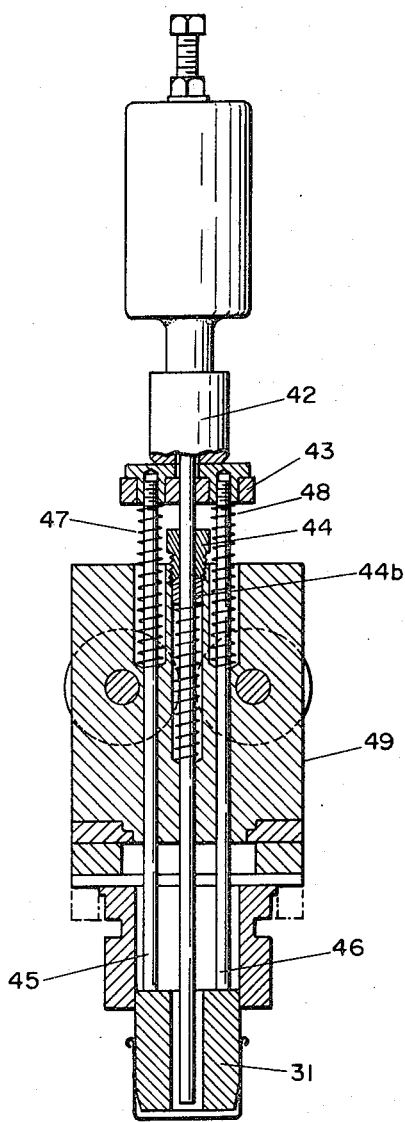
Figure 9:
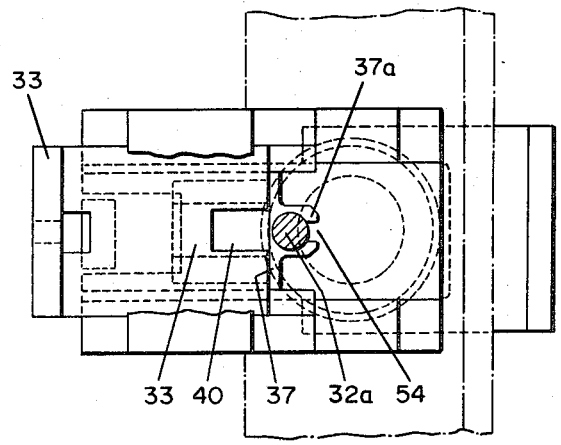
Figure 10:
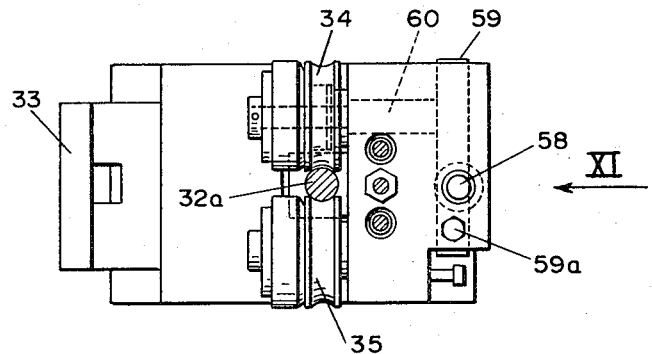
Figure 11:
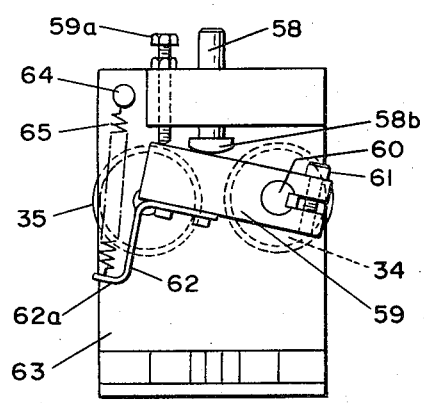
Figure 12:
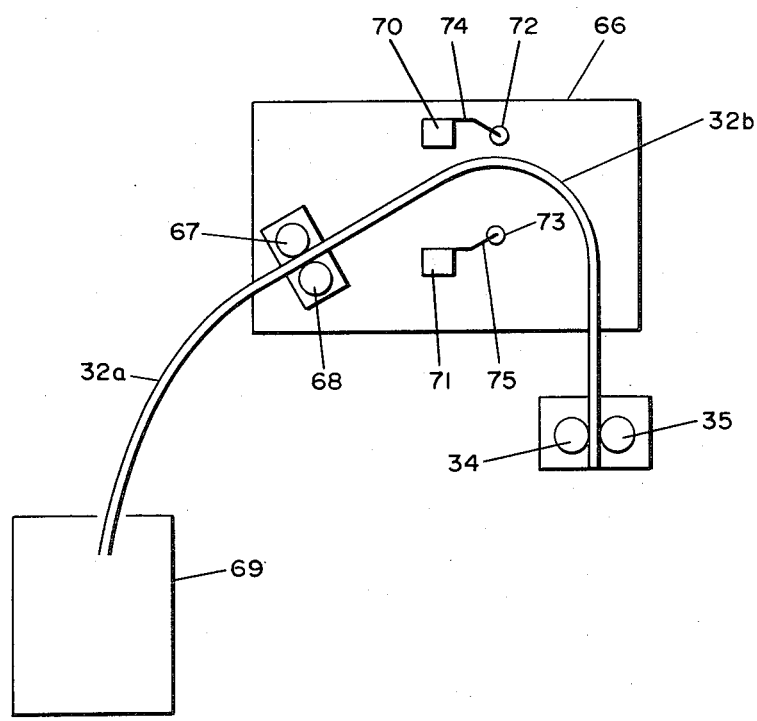

In order that the present invention may more readily be understood, the following description is given, merely by way of example, reference being made to the accompanying drawings in which:

FIG. 1 is a schematic, side elevation of an apparatus for forming closure liners, each apparatus comprising a pair of conveyors associated with a heating oven, the transfer between conveyors being achieved by means of the apparatus of the invention;

FIG. 2 is a longitudinal sectional view, taken on the line II—II of FIG. 4, showing an article carrying tray adapted to be carried by the conveyors of FIG. 1;

FIG. 3 is a sectional view taken on the line III—III of FIG. 2;

FIG. 4 is a top plan view of the apparatus of FIG. 2;

FIG. 5 is a partly schematic sectional view taken on the line V—V of FIG. 1, the oven being omitted for purposes of clarity;

FIG. 6 is a partly schematic top plan view of the apparatus of FIG. 5;

FIG. 7 is a side view, partly in section, showing a combined pellet forming and dispensing tool for use with the closure lining apparatus of FIGS. 1 to 6;

FIG. 8 is a sectional view taken on the line VIII—VIII of FIG. 7;

FIG. 9 is a sectional view taken on the line IX—IX of FIG. 7;

FIG. 10 is a sectional view taken on the line X—X of FIG. 7 and showing the rod feed rollers in position, these having been omitted from the FIG. 1 view for the purposes of clarity;

FIG. 11 is a side elevational view of the detail of FIG. 10, and taken along the direction of the arrow XI thereof; and FIG. 12 is a side elevational view of the rod feed arrangement for supplying plastics rod to the pellet forming tool of FIGS. 7 to 11.

Referring now to the drawings, and in particular to FIG. 1, there is shown a horizontal conveyor 1 running over pulleys 2 and 3, the conveyor 1 being in the form of a pair of chains operating in spaced parallel planes each chain passing about one of a pair of pulleys 2 and one of a pair of pulleys 3. Positioned above the upper run of the conveyor 1 is an oven 4 shown in broken lines in this figure, a further conveyor 5 being arranged for transporting articles from the upper run of horizontal conveyor 1 over a series of vertically and horizontally spaced pulleys 6, 7, 8, 9 and 10, after which the articles are once again deposited on the upper run of the conveyor 1 adjacent the lower right hand corner of the oven 4. Further pulleys 11 and 12 below the upper run of the conveyor 1 provide for return of the conveyor 5 to complete a closed circuit arriving back at the pick-up point near the lower left hand corner of the oven 4. The oven 4 of this apparatus is provided with gas burners 24 at the lower part thereof, heating the air within the oven being achieved by convection currents in the air. If required some means of forced draught circulation may be provided.

The particular embodiment of apparatus described in this application is a device for placing a plastics material in the top of a bottle closure and then cold moulding the material to form a liner. FIG. 2 shows a tray 13 having a base 13a containing a series of recesses 14, 14a, 14b, 14c, 14d, 14e, and 14f, each of such recesses being able to receive and locate a bottle closure in the inverted position (in other words with the opening uppermost). A plurality of trays 13 is provided and the conveyor 1 is able to transport them in a clockwise direction as viewed in FIG. 1.

The conveyor chains of the horizontal conveyor 1 are provided with upstanding studs 15a and 15b (see FIG. 5) which engage in keyhole slots 16a and 16b in the tray 13. On the other hand, the chains of the conveyor 5 are provided with laterally extending pegs 17a and 17b, each such peg being provided with a transversely extending end portion 18a and 18b extending parallel to the direction of travel of the chain.

Each tray 13 is provided with two upwardly extending lugs 19a and 19b each of which is positioned at one end of the tray, the lugs 19a and 19b being of substantially triangular form and being provided with triangular cutaway portions 20a and 20b. A short rectangular cutaway 21a, 21b extends slightly inwardly of the associated lug 19a, 19b for a purpose which will be described below. The trays 13 are transferred from the horizontal conveyor 1 to the vertical conveyor 5 by vertical upward movement of the pegs 17a and 17b and associated end portions 18a and 18b, the end portions entering the cutaways 21a and 21b and engaging slightly inwardly of the lugs 19a and 19b so that such lugs are supported pivotally by engagement of the pegs 17a and 17b against the apices of the triangular cutaways of 20a and 20b.

While the trays 13 are being transported horizontally along the upper run of conveyor 1 they are automatically located on the conveyor 1 by means of leftward movement of the tray 13 (as viewed in FIG. 2) in order to engage the associated studs 15a and 15b in the narrow diameter slits 22a and 22b of the keyhole slots 16a and 16b. Such leftward movement of the trays 13 is achieved by the action of a cam track 23a engaging against a vertically downwardly extending peg 23 of each tray 13 in order to urge the tray laterally leftwardly during advance thereof on the conveyor 1. Similarly, rightward unlocking movement of the tray 13 is achieved by a suitably disposed cam track elsewhere along the conveyor 1. In the apparatus shown an unlocking cam track 23a will be positioned just upstream of the oven 4 and a locking cam track will be just downstream of the other end of the oven 4.

Since various operations are to be carried out on the bottle closures held within the recesses 14, 14a, 14b, 14c, 14d, 14e and 14f, the motion of conveyor 1 is intermittent so that each stepwise movement of the conveyor advances a tray 13 to the position previously occupied by the preceding tray when stationary. In other words, the distance advanced by each tray corresponds to the spacing between longitudinal axes of adjacent trays on the conveyor 1.

The vertical conveyor 5 which carries the trays upwardly from the conveyor 1, through the oven 4 and then returns them back on the conveyor 1 is intended to give the trays 13 and articles being treated a considerable exposure time to the high temperature conditions in the oven. This conveyor executes a continuous movement as opposed to the intermittent movement of the horizontal conveyor 1.

Referring again to FIG. 1, it will be noticed that as the trays 13 of the conveyor 1 pass around the common axis of the pulleys 2 they come into register with the operative end of a closure loading device 26 comprising a chute guiding closures towards the closure dispensing station 26a. As the loaded trays pass rightwardly along the upper run of the conveyor 1 they first arrive at the pellet cutting and loading tool 27, after which the trays with the closures and pellets thereon pass along through a heat conditioning oven 4. The loaded trays are circulated through the oven 4 and replaced on the conveyor 1 before arriving at a moulding press 28 where a male mould is urged downwardly against the inner face of the end wall of the closure and compresses the pellet of mouldable plastics material to form a thin liner. Then the trays pass along the conveyor 1, around the common axis of the pulleys 3 at which point the closures, together with the already moulded liners are ejected into a receiving container 29. The pellet forming tool 27 is shown more clearly in FIGS. 7 to 11.

FIG. 7 shows a side elevational view of the pellet forming tool 27 and illustrates a closure 30 in position below a closure locating plunger 31 through which plunger the pellet is passed downwardly into the position shown in broken lines at 32. The pellet 32 is formed from a continuous rod 32a visible in FIG. 10 which is a sectional view taken on the line X—X of FIG. 7. However, FIG. 10 shows two rollers 34 and 35 which serve to advance the rod 32a but which are omitted from FIG. 7 for the purposes of clarity.

In use of the apparatus the rod 32a from which a pellet is to be severed is passed down through a cylindrical passage 36 shown in FIG. 7, by means of the rod advancing rollers 34 and 35. The pellet severing slide 33 is slidably mounted above a pellet holding slide 37 having a downwardly extending lug 38 secured to an operating push rod 39.

The pellet severing slide 33 is provided with a blade 40 which is caused to reciprocate in the horizontal direction and thereby to sever the pellet from the lower end of the rod 32a. After the severing operation has been completed the push rod 39 effects rightward movement of the lug 38 and pellet holding slide 37, with the result that the previously severed pellet 32 is moved laterally rightwardly away from the end of the rod 32a and into position directly under a pellet dispensing plunger in the form of the push rod 41.

Once the pellet is in position beneath the push rod 41 the hexagonal head of the bolt 42a secured to a main beam 51 is caused to descend by contact with a suitable cam or plunger, and as a result the lower end of the bolt 42a urges the push rod 41 downwardly freely through an adjusting nut 44. The nut 44 has a frusto conical recess formed in its lower end face and engaging with a suitably formed upwardly convex conical split collet 44b which is itself spring urged towards the nut 44 by a coil spring. Thus the push rod 41 can pass freely downwardly through the nut 44 but will be frictionally engaged by the collet on the return stroke.

Reference to FIG. 8 will show that the upper cross beam 43 is connected to parallel push rods 45 and 46 which are in turn secured to the closure holding plunger 31. Downward movement of the two push rods 45 and 46 is resiliently resisted by means of helical compression springs 47 and 48 extending between the upper cross bar 43 and an abutment surface on the body 49 of the tool.

As the push rod 41 descends the block 42 descends to contact the upper cross beam 43 which is normally in its FIG. 7 position. During this initial travel the push rod 41 will press downwardly against a previously formed pellet 32 and will cause it to travel down through the passage 50 extending axially of the closure holding plunger 31. Once the block 42 has contacted the upper cross beam 43, further downward movement of the block 42 and push rod 41 will cause simultaneous similar movement of the cross beam 43 carrying with it the two parallel push rods 45 and 46 secured to the closure holding plunger 31. Thus the plunger 31 will descend into a closure 30 to hold the closure in position, and during this descent the previously cut pellet 32 will be retained protruding through the lower end of the throughpassage 50 in the plunger 31. Since the pellet dispensing push rod 41 and the two parallel push rods 45 and 46 are travelling downwards at the same velocity there will be no tendency for the pellet to be displaced from the bottom of the plunger during this phase of the motion.

However, as the cross beam 43, arrives at the end of its resiliently resisted down stroke, the pellet 32 contacts the container closure 30.

The bolt 42a and beam 51 are urged upwardly by a camming arrangement to cause the lower face of the bolt 42a to move clear of the upper end of the dispensing plunger 41. This action permits the springs 47 and 48 to raise the cross beam 43 and parallel push rods 45 and 46, raising the closure holding plunger relative to push rod 41 until the wall 53 of the block 42 strikes the shoulder 52 and raises the dispensing plunger 41 clear of the pellet 32 which by now is firmly engaged in the closure on the tray 13.

The apparatus is so programmed that the pellet holding slide 37 is moved back towards its withdrawn position during downward movement of the push rod 41, the withdrawing action being commenced once the pellet 32 has been displaced from the pellet holding slide 37. For this purpose the holding portion 37a of the slide 37 is of C shaped construction having an opening 54 parallel to the direction of travel of the slide 37 and having a width substantially equal to the diameter of rod 41 so that retraction of the slide 37 is permitted while the push rod 41 is in register with the holding portion. Thus by the time the push rod 41 reaches its lowest position the slide 37 is in its FIG. 7 position ready to receive the next pellet to be severed. Downward movement of the push rod 41 is arranged to entrain a push rod holder 56 carrying and adjacent push rod 55 locked in position by a transverse plunger 56a slidably fitted within the holder 56. In fact the holder 56 is caused to move downwardly together with the movement of the push rod 41 so that eventually the lower end 55a of the adjacent push rod 55 strikes the upper end 58a of a plunger 58 towards the lower limit of travel of the push rod 41. Thus, during the last part of the downward travel of the push rods 41 and 55, the plunger 58 is caused to descend as well.

Referring now to FIGS. 10 and 11, the rod advancing mechanism is shown more clearly and, with particular reference to FIG. 11, it will be seen that the head 58b at the lower end of the plunger 58, when travelling downwardly, strikes a crank 59 clamped to the spindle 60 of the rod advancing roller 34 by means of a bolt 61. The free end of the crank 59 carries a Z-shaped leaf 62 having a lower bracket 62a linked to a bolt 64 on the frame 63 by means of a helical tension return spring 65. As the plunger 58 moves downwardly the crank 59 is caused to pivot in the anti-clockwise sense as viewed in FIG. 11. However, during this time the spindle 60 of the rod advancing roller 34 has also moved in the anti-clockwise direction and will entrain the roller 34. Thus, during each downward movement of the pellet dispensing plunger or push rod 41 the rod advancing roller 34 will execute a small anti-clockwise angular movement at the end of the down stroke of the push rod 41. The rod advancing roller 34 is secured to the spindle 60 through the agency of a ratchet mechanism so that, as the adjacent push rod 55 commences its upward travel the tension in the return spring 65 urges the spindle 60 and crank 59 to return to the FIG. 11 condition, thereby causing upward movement of the plunger 58 until the crank 59 strikes an end stop bolt 59a. During such time the rod advancing roller 34 will remain stationary, so that during several successive pellet dispensing cycles the roller 34 will execute an intermittent anti-clockwise rotary motion. The adjacent rod advancing roller 35 acts as a non-return roller by virtue of a reverse action ratchet arrangement permitting free clockwise motion and no return anti-clockwise motion (as viewed in FIG. 11).

It will be appreciated that the sequencing of the apparatus is such that, by the time the rod 32a commences its downward movement induced by the down stroke of plunger 58, the pellet severing slide 33 and the blade 40 will already have returned to their FIG. 7 positions. Thus, while the push rod 41 is ascending at the end of a pellet dispensing cycle the next pellet is in position ready to be severed by advancing motion of the blade 40 relatively to the pellet holding slide 37. After the severing operation the pellet holding slide 37 will itself move laterally to align the pellet directly below the dispensing plunger 41 prior to the next down stroke of the push rod 41.

FIG. 12 illustrates clearly the rod feed mechanism by means of which the tension in the rod 32a may be carefully controlled or even substantially eliminated despite the fact that the rod stock may be fed from within a drum or other suitable container. The rod feed arrangement comprises a pair of closely spaced side plates 66, one of which is shown in the figure, the spacing between the side plates being slightly greater than the diameter of the rod 32a being fed. Two rod feeding rollers 67 and 68 are provided at one corner of the rectangular side plates 66 and are arranged to feed the rod from a drum 69 or other container of stock material. Clearly, if the rod is coiled within the drum 69 as will most likely be the case, the tension in the rod would vary as the rod 32a is withdrawn from the drum. However, the rod is pulled out of the drum 69 positively by means of the feed rollers 67 and 68 and is directed obliquely upwardly into a loop 32b from which the rod travels downwardly towards the two rod advancing rollers 34 and 35 of the pellet cutting tool 27. Clearly the closely spaced side plates 66 will confine the loop 32b to lie substantially in a single plane.

The curvature of the loop 32b is controlled by means of a pair of limit switches 70 and 71 carrying sensing rollers 72 and 73 respectively at the ends of pivotable arms 74 and 75. The switches 70 and 71 are electrically connected to control the operation of a clutch driving the rollers 67 and 68 and operate as follows.

Initially the apparatus is threaded so that the end of the rod 32a passes from the drum 69, through the nip between the rollers 67 and 68 into the loop 32b and then downwardly into the nip between the rollers 34 and 35 of the pellet forming tool 27.

Once the closure lining apparatus commences operation and the pellet forming tool 27 entrains the rod 32a for downward movement through the nip between the rollers 34 and 35, the loop 32b will clearly diminish in extent and will become of wider curvature, unless rollers 67 and 68 are driven to feed rod material into the loop 32b. However, no such movement of the rollers 67 and 68 is initiated until the diminishing loop 32b strikes the sensing roller 73 of switch 71 and completes the circuit to the motor driving the rollers 67 and 68. The rollers commence rotation thereby causing the loop 32b to expand and to have tighter curvature, until such time as the loop strikes the sensing roller 72 of the upper switch 70 and causes deenergisation of the circuit. Clearly, at this stage contact with the sensing roller 73 has ceased and thus the lower switch 71 will have returned to its open condition. The circuit to the clutch and employing the switches 70 and 71 is so arranged that actuation of the switches 70 and 71 trips the circuit to an energised or deenergised condition, and the circuit remains in such condition until the other of the two switches is actuated and causes the circuit to revert to its original condition. Hence the rollers 67 and 68 are driven intermittently and the extent of the loop 32b is controlled to lie within two extreme conditions, the extremes being so chosen that no undue tension is exerted on the rod as it is fed to the rollers 34 and 35.

Any tendency for the tension to fluctuate due to the uncoiling of rod within a container such as the drum 69 will be controlled by virtue of the high driving force which may be exerted by the feed rollers 67 and 68. Thus any fluctuation in tension upstream of the rollers 67 and 68 may be neglected since the rollers are driven in response to tension fluctuations downstream. Their operation is such as to minimise the downstream tension and to damp out fluctuations in tension.

Although no direct heat is applied to the slug of plastics material during the moulding operation it is envisaged that the closure shall have been preheated by some form of radiant heating, e.g. infra-red heating, positioned just downstream of the closure dispensing station but upstream of the slug dispensing and moulding station. By preheating the closure, it can be ensured that the slug of plastics material adheres on impact with the closure.

The trays 13 carrying the container closures and associated pellets are then passed from the horizontal conveyor 1 to the vertically travelling conveyor 5 and through the oven 4 for conditioning. After the conditioning step the trays 13 together with the bottle closures and pellets are returned to the horizontal conveyor 1 and then travel past the moulding station 28 to a closure ejecting station.

Although shown in connection with one intermittently moving conveyor 1 and one continuously moving conveyor 5, the transfer device for moving trays from one conveyor to the other may equally be associated with two intermittently moving conveyors or two continuously moving conveyors.

The nature of the conveyors concerned will clearly be related to the type of process with which the conveyors and transfer mechanism are associated.

The advantage of the particular form of conveyor mechanism used is that a long heat soak time is available and a low oven temperature may be employed, with the result that any jamming of the apparatus would be unlikely to necessitate the scrapping of considerable quantities of half treated closures. Clearly, where the oven temperature is high, the damage caused by even a short period of overexposure to such temperature would be detrimental to the quality of the closure.

A further advantage of the long dwell time at a low temperature rather than a short dwell time at a high temperature is that there is no danger of the heat curing process resulting in marking of the exterior of the closure. Since it may be desirable to decorate the outside of the cap before moulding the liner there is clearly considerable advantage in being able to heat the closure without damaging any previously imprinted design on the exterior surface of the closure. A particular advantage of transferring the closure in trays rather than individually is that any part of the decoration which might have been softened in the oven 4 will be unlikely to be damaged since the closures themselves are always resting in the tray.

Moreover, by providing a conveyor which travels vertically through the oven 4 the floor space occupied by the oven which, by virtue of the long dwell time used, will involve a path of travel of considerable length, may be kept to a minimum because of the sinuous path. Moreover, since there is no requirement for indexing of the conveyor travelling through the oven it is advantageous that the oven conveyor should be continuously moving and may therefore be lighter, whilst still being capable of extracting trays from an indexed horizontally moving conveyor so that the conveyor chain employed in the higher temperature environment of the oven is not subjected to the shock loading which would result from indexing movement. Clearly the conveyor chain travelling through the oven may be considerably lighter than the chain employed on the conveyor 1.

A modification of the process and apparatus described would be the introduction of the plastics material in the form of a plastisol in which case the pellet dispensing tool 27 would be replaced by a plastisol spray. This would involve alterations to the oven 4.

It will be appreciated that if desired a positive locking arrangement, similar to the keyhole slots 16a and 16b, may be provided so that the tray 13 may be locked to both the conveyors 1 and 5. Such an arrangement would prevent the possibility of any inadvertent release of the tray 13 from conveyor 5.

A further possible modification to the apparatus may comprise forming the closure holding plunger 31 as a split collet assembly having a short narrow diameter portion at the lower end of the throughbore to hold the pellet and prevent it from falling straight through the closure holding plunger before descent of the pellet dispensing plunger 31. Such undesirable premature release could cause the pellet to land in the closure on its side rather than on an end.

The bolt 59a shown in FIG. 11 not only defines an end stop to the clockwise return motion of the crank 59 but, by virtue of its adjustability, it enables the pellet length and hence film weight of the moulded liner to be varied. Lowering the bolt 59a shortens the stroke of crank 59 and thereby reduces the length of rod 32a advanced during each cycle.

A closure detection device may be provided for sensing the presence of a closure in the appropriate aperture of a tray 13, so that the pellet forming tool may be disenabled for a cycle and there will be no chance of a pellet being inserted into an empty tray aperture 14. Such a sensing device may be electrical, pneumatic or of any suitable form and will be associated with a transverse plunger 56a shown in FIG. 7 as extending transversely of the push rod holder 56 and preventing the adjacent push rod 55 from rising up into a cylinder recess 56b.

If the sensing device of the detection system transmits a signal indicating an empty aperture 14 just upstream of the closure holding plunger 31, the transverse plunger 56a is withdrawn thereby allowing the adjacent push rod 55 to move upwardly with the recess 56b as the push rod holder 56 descends. This upward travel, resiliently resisted by a helical compression spring 57 ensures that the plunger 58 is not depressed and hence no advance of rod 32a will take place. Thus at the next cycle, when the empty aperture 14 is in register with the closure holding plunger 31, the dispensing plunger 41 and transfer slide 37 operate normally but no pellet is dispensed.

The sensing device may be of any suitable form, but a particularly convenient embodiment may comprise an air jet which is directed past a position normally occupied by a closure so that when no closure is present the jet is continuous, and may enter a receiving passage for amplification by a fluid logic circuit, and thus actuate a suitable pneumatic actuator for the transverse push rod 56a.

We claim:

1. Apparatus for moulding liners of plastics material inside removable container closures, such apparatus comprising a first conveyor, means for driving said first conveyor in stepwise manner, a second conveyor, means for driving said second conveyor in continuously moving fashion, trays for carrying closures in which liners are to be moulded, means for transferring said trays from said first conveyor to said second conveyor, means for transferring said trays back from said second conveyor to said first conveyor, means for introducing closures to the trays, means for forming a pellet of mouldable plastics material, means for placing said pellet inside a closure, means for compressing the pellet to form a closure liner, an oven through which said second conveyor passes in a substantially vertical direction of travel, and means for collecting the lined closures from the trays after the trays have been returned to the first conveyor.

2. Closure lining apparatus as set forth in claim 1 tics material comprises a rod holding device, means for feeding a rod of said material to said rod holding device, a laterally reciprocable blade for severing a pellet from the end of said rod, and means for moving said rod holding device laterally to carry the severed pellet into a laterally displaced position, and wherein the means for placing the severed pellet in a closure comprises a pellet dispensing plunger reciprocable to urge said pellet from its displaced position downwardly into a closure.

3. Closure lining apparatus as set forth in claim 2, wherein said pellet holding device comprises a reciprocable plate having a thickness substantially the same as or greater than the thickness of the pellet to be formed, cylindrical aperture means in said plate, said blade being arranged for reciprocation across the upper surface of the plate whereby a pellet is severed from a rod which has its lower end in contact with said abutment surface.

4. Closure lining apparatus as set forth in claim 3, wherein said cylindrical aperture means communicates with slot means extending radially of said aperture means and terminating at an edge of said plate, said slot being at least as wide as the pellet dispensing plunger, whereby the pellet holding device may, after removal of the pellet therefrom, be withdrawn away from its laterally displaced position before said pellet dispensing plunger has returned to its raised condition.

5. Closure lining apparatus as set forth in claim 2 and including a closure holding plunger disposed coaxially with said pellet dispensing plunger, and means for effecting descent of the pellet dispensing plunger into the closure to locate the closure with respect to the pellet dispensing plunger, whereby the pellet dispensing plunger displaces the pellet downwardly through said closure holding plunger.

6. Closure lining apparatus as set forth in claim 5, and including means for reciprocating said pellet dispensing plunger through a predetermined stroke, means for restraining said closure holding plunger during a first part of said stroke, means for moving said closure holding plunger downwardly along with the pellet dispensing plunger during a final part of said stroke, and means for restraining said pellet dispensing plunger in a pellet holding position while said closure holding plunger executes a first part of its return stroke whereby the pellet is displaced downwardly out of the closure holding plunger.

7. Closure lining apparatus as set forth in claim 2, and wherein said means for severing a pellet from said rod includes a pair of rod advancing rollers, ratchet means connected to at least one of said rollers, a crank connected to said ratchet means, and means for causing pivotal motion of said crank in a first direction during a pellet dispensing operation, and spring biasing means effecting return movement of said crank in a second direction, said ratchet being arranged to permit at least one roller to remain stationary as said crank executes its return movement.

8. Closure lining apparatus as set forth in claim 7, wherein both rollers are provided with ratchet means which act in opposite directions so that one roller is freewheeling in one sense of rotation and the other roller is freewheeling in the opposite sense.

9. Closure lining apparatus as set forth in claim 8 and including means for forming a loop of said plastics rod above said rod advancing rollers and means for controlling the length of the loop so formed.

10. Closure lining apparatus as set forth in claim 9 wherein said loop length controlling means comprises a pair of driven rod feed rollers, a pair of spaced limit switches one positioned within said loop and the other positioned outside said loop, and means electrically connecting the limit switches with said driven rod feed rollers for effecting rotating of said feed rollers as said one switch senses contact with said loop.

References Cited
UNITED STATES PATENTS

| | | | |
|---|---|---|---|
| 2,138,813 | 12/1938 | Bemis | 198—20 |
| 3,265,016 | 8/1966 | Cheung | 425—112 X |

ROBERT L. SPICER, Jr., Primary Examiner

U.S. Cl. X.R.

425—289